Jan. 23, 1934. A. W. HULL Re. 19,057

THERMIONIC CATHODE LAMP AND METHOD OF OPERATING THE SAME

Original Filed Oct. 15, 1927

Inventor:
Albert W. Hull,
by Alexander S. Lante
His Attorney.

Reissued Jan. 23, 1934

Re. 19,057

UNITED STATES PATENT OFFICE 19,057

THERMIONIC CATHODE LAMP AND METHOD OF OPERATING THE SAME

Albert W. Hull, Schenectady, N. Y., assignor to General Electric Company, a corporation of New York Original No. 1,929,143, dated October 3, 1933, Serial No. 226,275, October 15, 1927. Application for reissue November 27, 1933. Serial No. 699,993

18 Claims. (Cl. 176—124)

Figure 1:
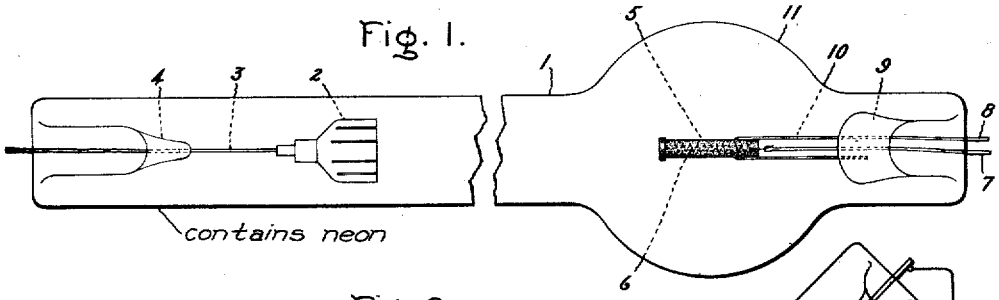

The present invention relates to gaseous glow lamps, that is, to lamps in which an electric discharge is conducted for illuminating purposes through a column of suitable gas or vapor, such, for example, as neon or mercury vapor.

In accordance with my invention I have produced a new form of gaseous glow lamp having a high efficiency, long life and other advantages and which is provided with a thermionic cathode.

Glow lamps heretofore have been provided with non-thermionic electrodes, that is, electrodes which are caused to emit electrons by bombardment but which are not operated during use at a temperature of thermal electron emission. As the electron emissivity of such non-thermionic electrodes is relatively small per unit of area, it has been necessary for practical purposes to operate columnar lamps with currents well below 100 milliamperes. Even at this relatively low current value, it was necessary to provide such a lamp with awkwardly large electrodes.

In such gaseous glow lamps having non-thermionic or "cold" electrodes there is a relatively large voltage drop at the cathode which represents a loss of energy, and which causes disintegration or sputtering of the cathode and blackening of the lamp walls. In the case of neon lamps this voltage drop is about 200 volts, or more. In order that this large voltage drop should not constitute too large a fraction of the total operating voltage and thus render the operating efficiency of such lamps uncommercially low, it was necessary to construct such lamps for operation at voltages of several thousand volts.

The intrinsic brilliancy of the illumination of such low current lamps being correspondingly low, their usefulness was limited. For example, they could not be used most effectively for display or advertising purposes in places where the general illumination is high, the contrast which makes such monochromatic illumination effective being partially lost under these conditions.

It was suggested heretofore to substitute a thermionic filamentary cathode in place of the non-thermionic cathodes in gaseous glow lamps, but the lamps proposed were not suitable for operation with substantial currents nor for long periods and the filamentary cathodes were subject to excessive electrical disintegration or sputtering.

I have discovered that thermionic cathode gaseous glow lamps can be constructed to give a thousand hour or longer period of operation with currents higher than 100 milliamperes (1/10 ampere), if the cathode fall of potential is maintained below a limiting value which I have termed the disintegration voltage. This may be done by so correlating the electron emissivity of the cathode with relation to the space or glow current which the lamp is designed to carry that the fall of potential at the cathode does not exceed the disintegration voltage. The "disintegration voltage" is always greater than the ionization voltage of the gas content of a lamp and in a lamp having a luminous column of appreciable length is materially less than the difference of potential between the electrodes.

In operation at current values of high luminous efficiency a commercial length of lamp life has not heretofore been obtained in gaseous glow lamps employing thermionic cathodes. In thermionic gaseous glow lamps heretofore proposed the cathode has been a filament. If such a cathode is to give an adequate electron emission the filament must either be of such length that the potential drop between its terminals is greater than the disintegration voltage, or of increased thickness, in which case the magnetic field of the heating current interferes with or prevents an effective electron emission. If more than one filament were operated in parallel the discharge would run from one filament only and cause its rapid destruction.

While my invention in a general sense includes gaseous glow lamps having cathodes of any form or shape providing their electron emissivity is sufficiently high to support a desired operating current without causing the fall of voltage at the cathode to be greater than the "disintegration voltage," in the preferred embodiments of my invention, indirectly heated non-filamentary cathodes are employed constructed to furnish electron emission capable of supplying a space current which the lamp is designed to carry at a temperature of inappreciable thermal disintegration and which operate either with no potential drop between extremities or operate with potential drop less than the disintegration voltage. Such electrodes, for example, may assume the form of relatively thin walled hollow bodies coated with a thermionically active material and being maintained at operating temperature by radiation or conduction of heat from a suitable heater. In an attenuated gas, electrodes coated with a thermionically active material can be operated at a higher temperature than in a vacuum without loss of the coating material but the foundation material slowly evaporates at the most effective operating temperature. Unlike filamentary electrodes which are heated by the application of current at their terminals, electrodes such as herein shown and described will continue to function even after the nickel, or other foundation material, has been dissipated to such extent that only a skeleton or lace-work remains. Also, unlike lamps containing filamentary cathodes, no tendency exits in lamps embodying my invention for the discharge to concentrate at the negative terminals. To distinguish such broad area cathodes over filamentary cathodes which burn out quickly in a glow lamp due to local disintegration, I shall refer to cathodes having such effective configuration as "broad cathodes."

Lamps embodying my invention having an illuminating column of moderate length and containing a gas or vapor of high luminosity, such as neon or mercury vapor, may be operated on ordinary commercial lighting circuits of 110 to 115 volts, with a commercially long life, at lighting efficiencies formerly attainable only in non-thermionic glow devices when operating at voltages of four to five thousand volts. Lamps embodying my invention may be operated at current values materially about 1/10 ampere and ordinarily of one to several amperes with high intrinsic brilliancy, and a luminous efficiency of about 15 lumens per watt. They may be constructed in large units giving a higher total illumination than was possible heretofore. The discharge is diffuse, filling the entire discharge space, but otherwise is arc-like in its characteristics.

Figure 2:
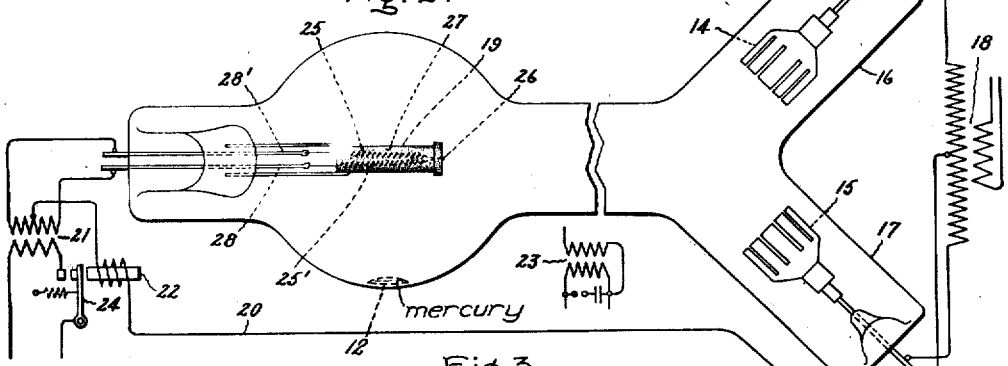
Figure 3:
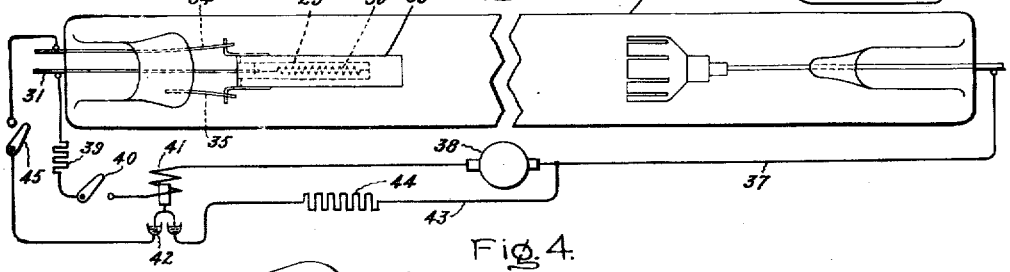
Figure 4:
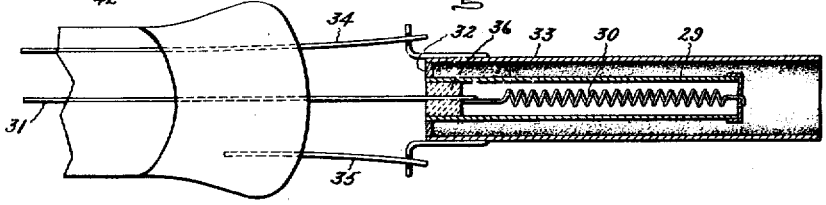
Figure 5:
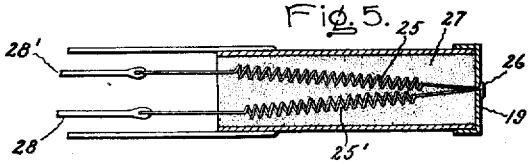

My invention which includes a new method of lamp operation as well as a new device will be explained in greater detail in connection with the accompanying drawing of which Fig. 1 is a side elevation of a preferred embodiment of my invention containing a permanent gas; Fig. 2 illustrates an operating circuit for alternating current and also a modification in which mercury vapor is used; Fig. 3 illustrates a direct current operating circuit and also shows in side elevation another modification in which the enlargement of the envelope about the cathode is absent, and Figs. 4 and 5 are enlarged sectional views of cathode structures.

Referring to Fig. 1, the lamp here shown embodying my invention has a tubular envelope 1 consisting of glass, silica, or other suitable transparent material. This envelope has been shown as broken to indicate that it has a considerable and varied length depending in any particular case on conditions. For example, for a 110 volt lamp, containing neon an envelope 2.5 c.m. in diameter and about 50 to 60 c.m. long may be used. The anode 2 carried by a stem 3, which is sealed into the press, 4, is of the usual construction, and may consist of nickel, iron, molybdenum, their alloys, or other suitable material. The cathode 5 may be constituted of a relatively thin cylinder of nickel coated with a suitable thermionically active material. I may use, for example, an alkaline-earth compound, such as barium carbonate, preferably with a suitable binder, such as a solution of a cellulose compound. This cathode is heat treated to render it active. This treatment consists in raising the temperature of the coated cathode to about 1050 to 1300° C. while the envelope 1 is being evacuated of gas. In the case of a foundation of nickel coated with barium, the forming treatment preferably should be carried close to the melting point of nickel. Evacuation is continued during this heat treatment in order to remove gaseous decomposition products. The barium carbonate is decomposed and a compound or alloy of barium and nickel is formed which has a metallic appearance as contrasted with the white appearance of the barium carbonate coating. During the operation of the lamp the cathode should be heated to a temperature somewhat below the formation temperature of the coating, say, to a temperature of about 1000° C.

The cathode is provided with an internal heater 6 consisting of tungsten, or other suitable material, receiving current by the conductors 7, 8, which are sealed into the press 9, the conductor 7 being joined to one end of the heater 6, and the conductor 8 being joined to the closed end of the cylinder 5. The latter in turn is joined electrically to the opposite end of the heater. The cathode structure is carried by a stem 10 fused into the glass press 9. The envelope 1 is expanded about the cathode into the form of a bulbous cathode chamber 11, to avoid overheating. It is charged after thorough evacuation with a suitable gas, such as neon, for example, at a pressure of, say about several microns to several m.m. of mercury. As shown in Fig. 2, a drop of mercury 12 may be introduced as a source of vapor. The length of the discharge path should be great enough to cause the fall of potential in the luminous column to be greater than the combined fall of potential at the electrodes, and ordinarily should be chosen to cause this potential drop to be several times greater than the combined electrode potential drop. A tube having a diameter of about 2.5 c.m. containing neon at a pressure of about two millimeters of mercury has a voltage drop of about one volt per c.m. with a current of about three amperes. At lower currents the voltage drop is greater as at this pressure the volt-ampere characteristic is slightly negative. This voltage drop varies inversely with the tube diameter. The potential drop is substantially constant over a pressure range from about two to five millimeters. The light intensity varies substantially as the 0.67 power of the current. As the voltage drop across the lamp decreases with increase in current, the luminosity is roughly proportional to the wattage consumption. A neon lamp embodying my invention operating with a drop of potential of about 120 volts in the lamp at a current of 2.9 amperes, and an energy consumption at the cathode of about 34 watts, gave a light emission of about 5350 lumens, that is, an efficiency of the discharge of about fifteen lumens per watt, and an overall efficiency of 10.7 lumens per watt, that is, taking into account losses in the stabilizing resistance and other losses.

A lamp embodying my invention may be constructed for operation either with direct or alternating current. I have illustrated in Fig. 2 a lamp having two anodes 14, 15, located in the branches 16, 17 of the vitreous envelope, these anodes being connected to the opposite terminals of the secondary of a transformer 18. The cathode 19 is connected by the conductor 20 to an intermediate point of the secondary of the transformer 18. An auxiliary transformer 21 is shown for heating the cathode although a battery or other suitable heating means may be used. The conductor 20 is connected in series with the coil of a contactor 22 to an intermediate point of the secondary of the transformer 18, that is, to approximately the neutral point.

A high frequency device, such as illustrated at 23 may be employed to facilitate starting of the discharge, not only of the device shown in Fig.

2, but in connection with any of the lamps embodying my invention. Such device and its action in starting is well known and hence will not be here described. When an operating current flows through the lamp, the magnet of the contactor 22 is energized, attracting its armature 24 and opening the primary circuit of the cathode heating transformer 21. The main current, which now passes through the cathode heater on its way to the anode maintains the cathode heated to an operating temperature. The cathode of the device shown in Fig. 2, as better shown in Fig. 5, is provided with two heater spirals 25, 25', connected in series with one another and also connected at 26 to the cathode shell 19. These heaters 25, 25' are imbedded in suitable refractory, insulating material 27, for example, magnesium oxide, contained within the shell 19. The exterior of the shell 19 is coated with suitable activating material. Current is supplied by the conductors 28, 28'.

Another modification of my invention is shown in Figs. 3 and 4, claims being made on the cathode construction of this modification in a divisional application Serial No. 683,143, filed August 1, 1933. The cathode cylinder 29 is hollow and contains a single heater spiral 30, one end of which is connected to a supply wire 31, the other end being connected to the shell 29. The shell 29 in turn is electrically connected by the ring-shaped member 32 to the shield 33. The shield 33 conserves heat and coating material which otherwise would be lost by radiation and evaporation from the cylinder 29 and thereby materially increases the efficiency and life of the cathode. Contact is made to this shield by a sealed-in conductor 34. A steadying support 35 is provided at the side of the cathode opposite the point of connection to the conductor 34. The exterior of the shell 29 and the interior of the shield 33 are coated with a material of high thermionic emissivity as described above. A spacing and insulating sleeve 36 consisting of alumina, or the like, preferably is provided between the conductor 31 and the shell 29. Either a fixed gas or a vapor may be introduced into the envelope 1, Fig. 3, after the gas and moisture content have been removed and the cathode has been activated.

In a copending application Serial No. 156,713, filed by me on December 23, 1926 claims are made on a gas-containing electrical discharge device embodying a thermionic cathode having a cavity coated with a material of high thermionic emissivity.

The lamp of Fig. 3, which is provided with such a cathode, requires no enlargement about the cathode because of the shielding effect of the cylinder 33. The lamp is shown connected by a circuit 37 to a direct current source 38 in series with a resistance 39, a hand operated switch 40, and the coil 41 of a mercury switch 42. The mercury switch 42 is in a parallel circuit 43 containing a resistance 44 and a switch 45. When the switches 40 and 45 are closed, current flows in the heater circuit 43, which thereupon is opened by the mercury switch, causing a high voltage impulse to be impressed upon the lamp. This action of the coil 41 may be repeated a number of times until the glow discharge is started. If desired a heating current also may be impressed on the conductors 31, 34 to bring the cathode to an operating temperature preliminary to starting, this current being interrupted after the lamp is started.

When the heater 30 is properly proportioned with respect to the energy source 38, the external resistance 39 may be omitted. The current through the gas in the lamp flowing through the heater 30 maintains the cathode at operating temperature. Although in the preferred forms of my invention the cathode heater serves also as a resistance for limiting the space or glow-producing current to or below the limiting value above which the cathode drop of potential would exceed the disintegration voltage and cause excessive sputtering of the cathode by positive ion bombardment, I wish it to be understood that various known means, such as an external resistance or a constant current source may be used for the same purpose.

In U. S. Patent 1,790,153 filed concurrently herewith broad claims are made for gas-containing electrical discharge devices which are provided with thermionic cathodes constructed and proportioned to provide a thermionic electron emission sufficient to support in the absence of positive ion bombardment the operating current such devices are designed to carry.

What I claim as new and desire to secure by Letters Patent of the United States, is:

1. An electric lamp comprising a sealed envelope, a luminosity producing gas therein at about one millimeter of mercury pressure, and cooperating electrodes including a broad thermionic cathode which is capable of supporting an arc discharge in said gas of at least an ampere, said electrodes being separated a distance sufficiently great to cause the total voltage drop between the same to be several times the ionization voltage of said gas, a source of current and means for limiting the value of the space current in said device with respect to the electron emission of the cathode to maintain the fall of voltage at said cathode less than the cathode disintegration voltage.

2. An electric lamp comprising an elongated, tubular envelope, a charge of neon gas therein at a pressure of about one to five millimeters of mercury, electrodes therefor comprising a broad thermionic cathode having an electron emissivity of several amperes at about 1000° C., an electric heater for said cathode and means for electrically operating said lamp in series with said heater.

3. An electric glow lamp comprising a light-transmitting envelope, a charge of gas therein which is capable of producing luminosity and having a pressure within the range of a few microns, to a few millimeters of mercury, electrodes mounted in said envelope, one of said electrodes being coated with a material of high emissivity, and a shield spaced closely about said coated electrode.

4. An electric lamp comprising a light transmitting envelope, an electrically luminous gas therein, and electrodes in said envelope spaced apart such distance that the fall of potential in the luminous column between said electrodes is greater than the combined potential falls at said electrodes, said electrodes including a cathode coated with alkaline-earth material of high electron emissivity and having an area large enough to support without the aid of positive ion bombardment an electrical discharge in said gas of at least about an ampere at a temperature of inappreciable thermal volatilization, and means for heating said cathode.

5. An electric lamp comprising a light-transmitting envelope, a charge of neon gas therein at a pressure of about one millimeter of mercury and electrodes mounted in said envelope at regions spaced apart such distance that in a luminous discharge between said electrodes the fall of potential in the gas between said electrodes will materially preponderate over the fall of potential at said electrodes, one of said electrodes being a hollow metal body coated with alkaline earth material, and an electrical resistance heater for said coated electrode, said coated electrode having a sufficient area to emit without the aid of positive ion bombardment a current of at least about an ampere at a temperature giving a commercially long life.

6. An electric lamp comprising a light-transmitting envelope, a charge of neon gas therein at a pressure of about several microns to several millimeters of mercury, and electrodes mounted in said envelope at regions spaced apart such distance that in a luminous discharge between said electrodes the fall of potential in the gas between said electrodes will materially preponderate over the fall of potential at said electrodes, one of said electrodes being a hollow body of nickel coated with alkaline earth material of sufficient area to maintain without positive ion bombardment a current the lamp is designed to carry at a temperature of about 1000° C. and a heater for said coated electrode.

7. An electric lamp comprising a container, a charge of luminosity-producing gas therein at a pressure within the range of about several microns to several millimeters, electrodes comprising a thermionic cathode and an anode spaced apart a sufficient distance to have during operation a voltage therebetween which is materially higher than the disintegration voltage for said gas, said cathode providing at a temperature of inappreciable thermal disintegration a thermionic electron emission sufficient to supply without the aid of positive ion bombardment substantially the entire operating current which said lamp is designed to carry.

8. An electric lamp comprising an envelope, a luminosity-producing gas therein, and electrodes therein spaced apart a sufficient distance to permit of the formation of a luminous positive column therebetween having a fall of potential materially higher than the disintegration voltage for said gas, one of said electrodes being a thermionic cathode which is capable of supporting an arc discharge of a current value of about one to several amperes substantially independently of positive ion bombardment of said cathode, and with a voltage drop at said cathode below the disintegration voltage for said gas.

9. An electric lamp comprising a transparent envelope, a charge of luminosity-producing gas therein at a pressure within the range of about several microns to several millimeters, electrodes comprising a thermionic cathode and an anode having a fall of voltage therebetween during operation which is materially higher than the disintegration voltage for said gas, said cathode being constructed and proportioned to provide at a temperature of inappreciable thermal disintegration a thermionic electron emission to supply substantially the entire operating current which said lamp is designed to carry without the aid of positive ion bombardment of said cathode, and means for limiting the operating current not to exceed said value.

10. An electric lamp comprising a sealed envelope, a gaseous filing therefor, electrodes therein one of which comprises a metal shell, a material of high electron emissivity coating said body, means for heating said body to a temperature of thermionic emission, said electrode being capable at a temperature of inappreciable disintegration of emitting an electron current of at least about an ampere, and a shield spaced closely about said body whereby radiation of heat and loss of coating material are materially reduced.

11. An electric lamp comprising a sealed envelope, an attenuated gas therein, a thermionic cathode therein which is capable at operating temperature of emitting an electron current of at least about an ampere, comprising a metal shell, a heater therefor, a material of high electron emissivity coating said shell, and a metal shield closely spaced around said shell, and an anode cooperating with said cathode.

12. An electric lamp comprising a sealed envelope, a gaseous filling therefor at a pressure of about one millimeter of mercury, electrodes therein one of which comprises a hollow metal body, an electric heater for said hollow electrode and means for electrically operating said lamp in series with said heater.

13. An electric lamp comprising an envelope, a gas therein at a pressure within a range of about several microns to several millimeters of mercury, electrodes therein one of which comprises a hollow metal body, a coating thereon of thermionically active material, an electric heater enclosed by said hollow electrode, and means for electrically operating said lamp in series with said heater.

14. The method of operating a positive column electric lamp containing a highly attenuated gas, a thermionic cathode coated with a material of high electron emissivity and a cooperating anode which consists in heating said cathode to a temperature of inappreciable thermal evaporation and conducting between said electrodes a current having a value not in excess of the limiting value at which the fall of potential at the cathode rises above the disintegration voltage for said gas.

15. The method of operating at voltages of at least about 110 volts a positive column electric lamp containing a gas at a pressure within the range of about several microns to several millimeters of mercury, and being provided with a thermionic cathode and an anode, which consists in causing said cathode to emit electrons capable of supporting a designed current at a temperature at which disintegration of said cathode is inappreciable and limiting the current between said electrodes to the designed value.

16. The method of operating a positive column electric lamp containing a gas at a pressure of about a millimeter of mercury, a thermionic cathode and an anode spaced apart at least about 50 centimeters and with impressed voltages materially higher than the cathodic disintegration voltage for said gas which consists in causing said cathode to emit by thermionic emission a current of about one to several amperes at a temperature at which thermal disintegration of said cathode is inappreciable and operating between said electrodes a current not in excess of the limiting value at which the fall of potential at the cathode rises above the disintegration voltage for said gas.

17. An electric lamp comprising a sealed envelope, a luminosity-producing gas therein, electrodes therein spaced apart a sufficient distance to permit of the formation of a luminous positive column discharge therebetween, and including a thermionic cathode, said cathode comprising an enclosure of conducting material having closely adjacent walls and an opening permitting the egress of an electrical discharge, a material of high electron emissivity in said enclosure, and means for heating said cathode to a temperature of thermionic emissivity, said cathode being capable at a temperature of inappreciable disintegration of emitting an electron current of at least about an ampere.

18. An electric lamp comprising a container, a charge of luminosity-producing gas therein, electrodes therefor comprising a thermionic cathode and an anode spaced apart a sufficient distance to permit of the formation of a luminous positive column therebetween, said cathode having an area large enough to provide a thermionic electron emission sufficient to supply a current of at least about an ampere at a temperature at which thermal disintegration is inappreciable, and with a fall of potential at the cathode so low that electrical disintegration also is inappreciable.

ALBERT W. HULL.

CERTIFICATE OF CORRECTION.

Reissue No. 19,057. January 23, 1934.

ALBERT W. HULL.

It is hereby certified that error appears in the printed specification of the above numbered patent requiring correction as follows: Page 2, line 25, for "about" read above; page 3, line 128, claim 3, strike out the comma after "microns"; page 4, line 72, claim 10, for "filing" read filling; and that the said Letters Patent should be read with these corrections therein that the same may conform to the record of the case in the Patent Office.

Signed and sealed this 6th day of March, A. D. 1934.

F. M. Hopkins (Seal) Acting Commissioner of Patents.